United States Patent
Lee

(10) Patent No.: US 7,855,828 B2
(45) Date of Patent: Dec. 21, 2010

(54) ELECTROPHORETIC DISPLAY DEVICE AND METHOD OF MANUFACTURING THE SAME

(75) Inventor: Woo-Jae Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 385 days.

(21) Appl. No.: 11/932,043

(22) Filed: Oct. 31, 2007

(65) Prior Publication Data

US 2008/0130091 A1 Jun. 5, 2008

(30) Foreign Application Priority Data

Dec. 4, 2006 (KR) .................. 10-2006-0127599

(51) Int. Cl.
G02B 26/00 (2006.01)

(52) U.S. Cl. ...................... 359/296; 345/107

(58) Field of Classification Search ............. 359/290, 359/296, 291, 238; 345/107, 84, 85
See application file for complete search history.

(56) References Cited

U.S. PATENT DOCUMENTS

| | | | |
|---|---|---|---|
| 6,788,450 | B2 | 9/2004 | Kawai et al. |
| 6,831,769 | B2 | 12/2004 | Holman et al. |
| 7,279,057 | B2 * | 10/2007 | Reid et al. .................. 156/71 |
| 7,557,981 | B2 * | 7/2009 | Liang et al. ................ 359/296 |
| 7,572,491 | B2 * | 8/2009 | Wang et al. ................ 428/1.5 |
| 7,652,656 | B2 * | 1/2010 | Chopra et al. .............. 345/107 |

FOREIGN PATENT DOCUMENTS

| | | |
|---|---|---|
| JP | 2003-280044 | 10/2003 |
| JP | 2005-070462 | 3/2005 |
| JP | 2005-070567 | 3/2005 |
| JP | 2005-084267 | 3/2005 |
| JP | 2005-208493 | 8/2005 |
| JP | 2006-154513 | 6/2006 |
| KR | 1020030069339 A | 8/2003 |
| KR | 1020040018186 A | 3/2004 |
| KR | 1020060019304 A | 3/2006 |
| KR | 1020060078319 A | 7/2006 |

* cited by examiner

Primary Examiner—Timothy J Thompson
(74) Attorney, Agent, or Firm—Cantor Colburn LLP

(57) ABSTRACT

An electrophoretic display device and a manufacturing method thereof are provided. The manufacturing method includes forming a first mother substrate that has a first thin structure, and forming a second mother substrate that has a second thin structure. The second mother substrate faces the first mother substrate. The manufacturing method also includes disposing an electrophoretic material on one of the first mother substrate and the second mother substrate, and enclosing a region on which the electrophoretic material is disposed with a sealant. The manufacturing method further includes combining the first mother substrate and the second mother substrate using pressure applied thereto to form an electrophoretic layer between the first mother substrate and the second mother substrate.

12 Claims, 20 Drawing Sheets

ELECTROPHORETIC DISPLAY DEVICE AND METHOD OF MANUFACTURING THE SAME

This application claims priority to Korean Patent Application No. 10-2006-0127599 filed on Dec. 14, 2006, and all the benefits accruing therefrom under 35 U.S.C. 119, the contents of which in its entirety are herein incorporated by reference.

BACKGROUND OF THE INVENTION (a) Field of the Invention

The present invention relates to an electrophoretic display device and method of manufacturing the same.

(b) Description of the Related Art

According to ubiquitous technology, flexible flat panel displays using a flexible substrate such as a plastic substrate having lightweight, impact resistance, and flexibility, have been developed.

In particular, electrophoretic display devices of the flexible flat panel display types that implement paper thin-like displays are becoming increasingly popular.

The electrophoretic display devices include an electrophoretic material interposed between two display panels having electrodes. The electrophoretic material includes a plurality of electrophoretic members having electrophoretic particles that have positive or negative charges and represent a predetermined color, and a binder. However, manufacturing these electrophoretic display devices is a complex and time consuming process.

BRIEF SUMMARY OF THE INVENTION

According to an exemplary embodiment of the present invention, a manufacturing method of an electrophoretic display device is provided. The manufacturing method includes forming a first mother substrate that has a first thin structure and forming a second mother substrate that has a second thin structure. The second mother substrate faces the first mother substrate. The manufacturing method includes disposing an electrophoretic material on one of the first mother substrate and the second mother substrate and enclosing a region on which the electrophoretic material is disposed with a sealant. The manufacturing method also includes combining the first mother substrate and the second mother substrate using pressure applied thereto, thereby forming an electrophoretic layer between the first mother substrate and the second mother substrate. The manufacturing method may further include cutting the combined first mother substrate and second mother substrate. The first thin film structure may include a thin film transistor. The formation of the first mother substrate may include forming a gate electrode on a substrate, forming a semiconductor on the gate electrode, forming a source electrode and a drain electrode on the semiconductor, and forming a pixel electrode on the source electrode and the drain electrode, the pixel electrode being connected to the drain electrode. The formation of the first mother substrate may include forming a gate electrode on a substrate, forming a semiconductor on the gate electrode, forming a source electrode and a drain electrode on the semiconductor, and forming a pixel electrode on the source electrode and the drain electrode, the pixel electrode being connected to the drain electrode. The second thin film structure may include a common electrode. The formation of the second mother substrate may include forming a light blocking member on a substrate, forming color filters on the light blocking member, and forming the common electrode on the color filters. The electrophoretic material may be disposed in a matrix pattern. The electrophoretic material may include a first electrophoretic particle representing a first color, a second electrophoretic particle representing a second color different from the first color, a dispersion medium in which the first electrophoretic particle and the second electrophoretic particle are dispersed, a capsule that encapsulates the first electrophoretic particle and the second electrophoretic particle, and a binder fixing the capsule. The first color may be white, and the second color may be black. The electrophoretic material may have a moisture content of about 40% to about 60%. The first mother substrate may include a plurality of sub-regions, and the manufacturing method may further include cutting the first mother substrate along lines formed between the sub-regions. The thin film transistor may be formed on the sub-regions. The second mother substrate may include a plurality of sub-regions, and the manufacturing method may further include cutting the second mother substrate along lines formed between the sub-regions. The common electrode may be formed on the sub-regions.

According to another exemplary embodiment of the present invention, an electrophoretic display device is provided. The electrophoretic display device includes a first substrate that has a first thin structure and a second substrate that has a second thin structure. The second mother substrate faces the first substrate. The electrophoretic display device includes an electrophoretic layer between the first substrate and the second substrate and that has an electrophoretic material, and a sealant enclosing a region on which the electrophoretic material is disposed. The second thin film structure may include a common electrode. The electrophoretic layer may include a first electrophoretic particle representing a first color, a second electrophoretic particle representing a second color different from the first color, a dispersion medium in which the first electrophoretic particle and the second electrophoretic particle are dispersed, a capsule that encapsulates the first electrophoretic particle and the second electrophoretic particle, and a binder fixing the capsule. The electrophoretic layer may have a moisture content of about 40% to about 60%.

BRIEF DESCRIPTION OF THE DRAWINGS

The above and other aspects, features, and advantages of the present invention will become more apparent by describing in further detail exemplary embodiments thereof with reference to the accompanying drawings, in which.

DETAILED DESCRIPTION OF THE INVENTION

Figure 1:
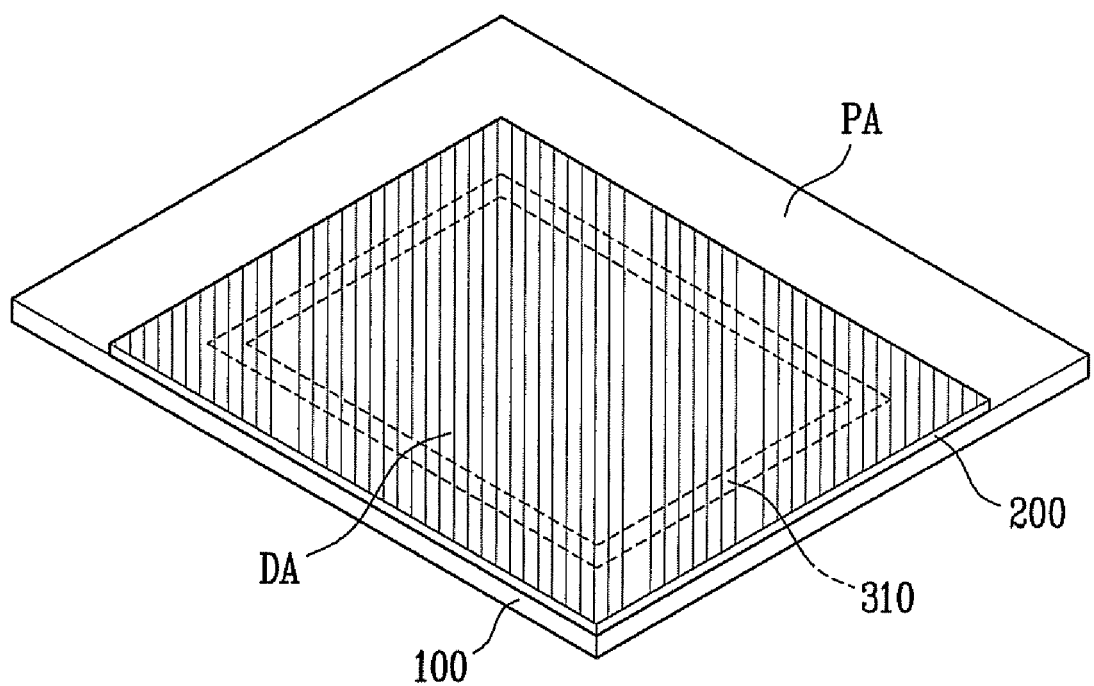
FIG. 1 is a perspective view of an electrophoretic display device in an exemplary embodiment of the present invention.

The invention now will be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

An electrophoretic display device and a manufacturing method thereof according to exemplary embodiments will now be described with reference to the drawings.

An electrophoretic display device according to an exemplary embodiment will be described in detail with reference to FIGS. 1 to 4.

Figure 2:
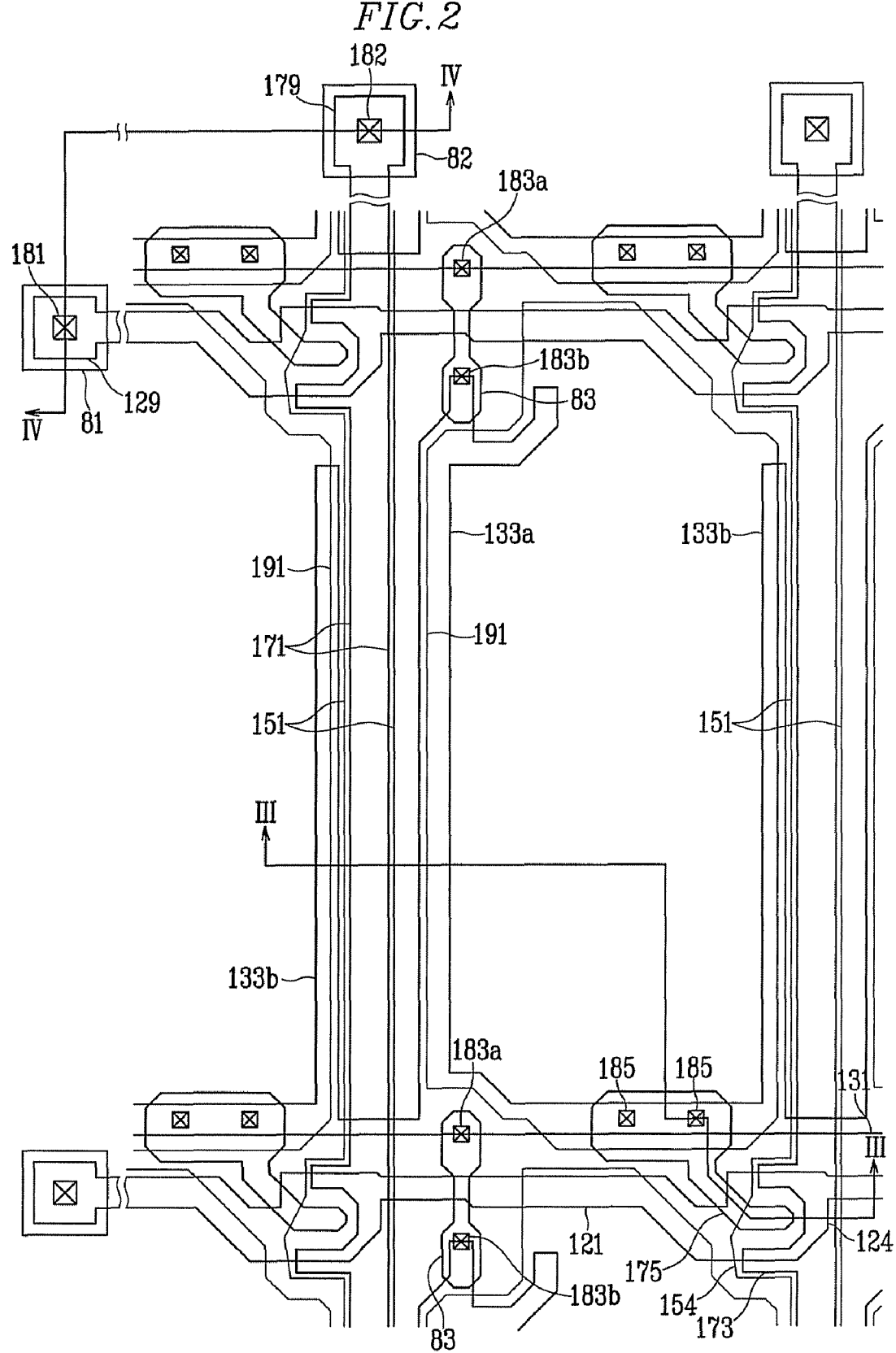
FIG. 2 is a plan view layout of an electrophoretic display device including a TFT array panel and a common electrode panel according to an exemplary embodiment of the present invention.
Figure 3:
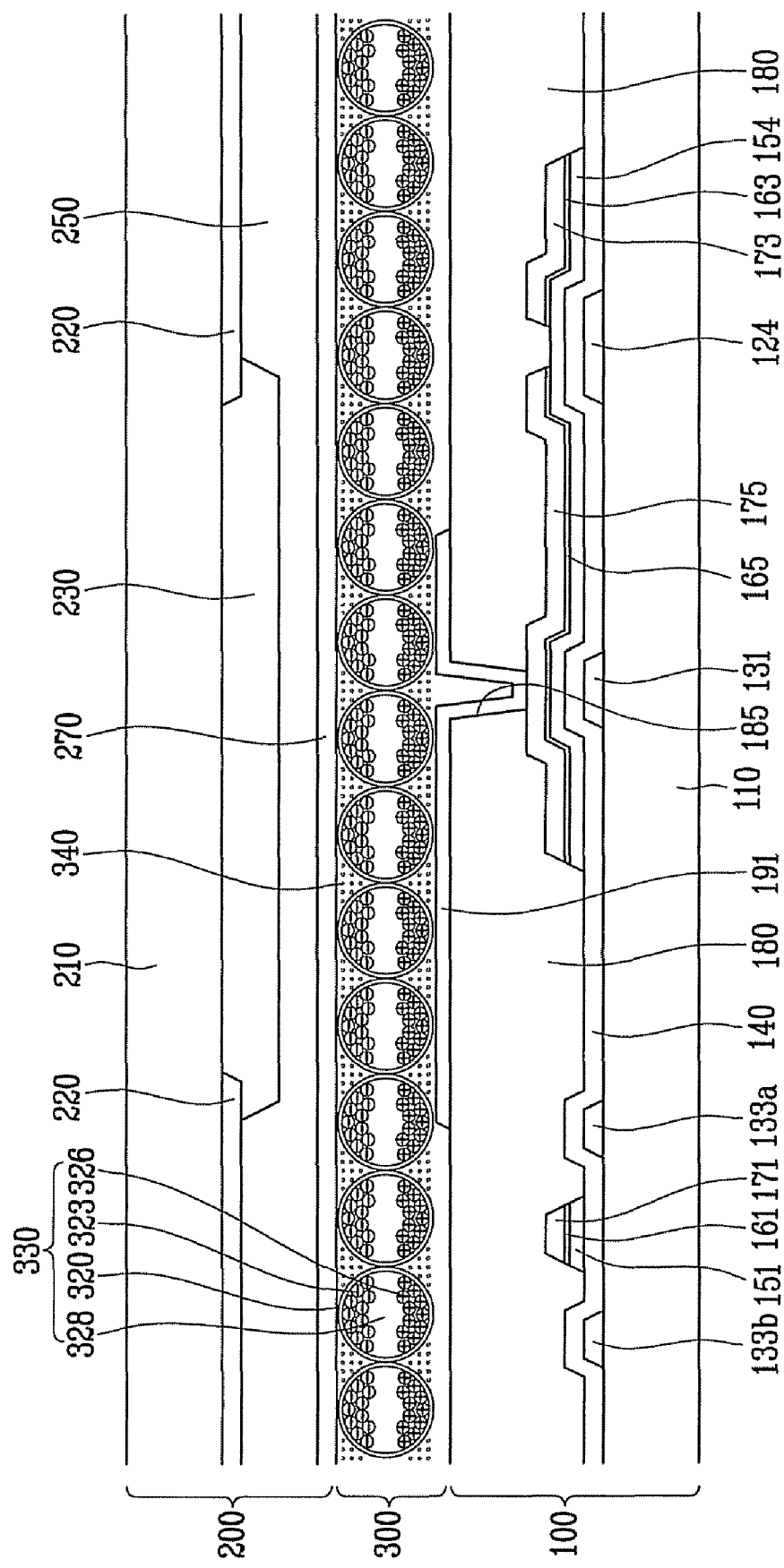
FIG. 3 is a cross-sectional view of the electrophoretic display device shown in FIG. 2 taken along the line III-III.
Figure 4:
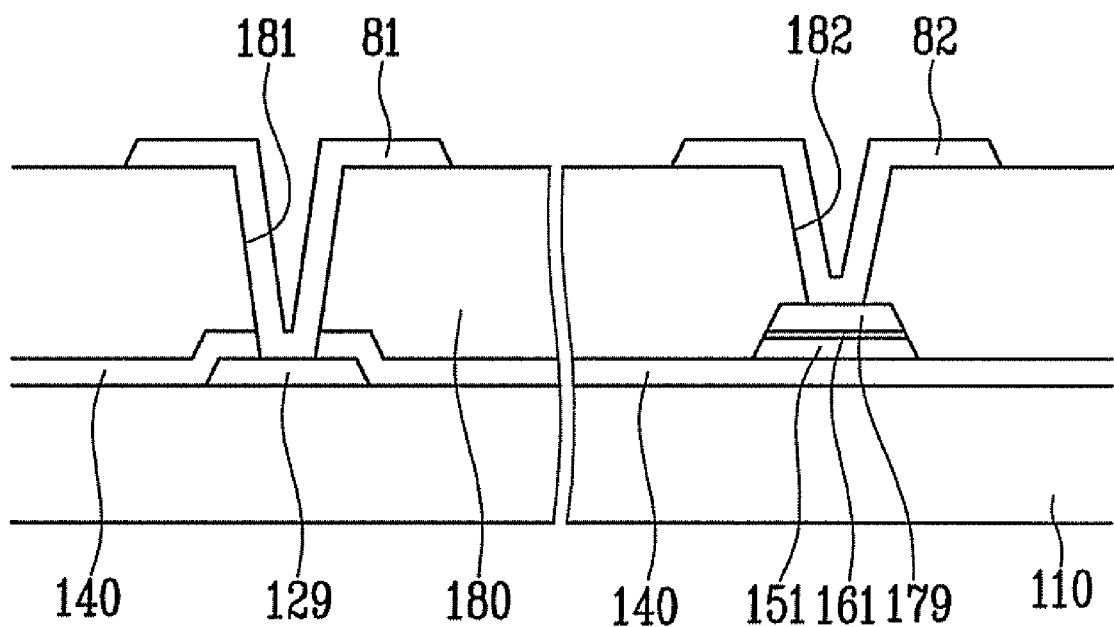
FIG. 4 is a cross-sectional view of the electrophoretic display device shown in FIG. 2 taken along the line IV-IV.

FIG. 1 is a perspective view of an electrophoretic display device in an exemplary embodiment of the present invention, FIG. 2 is a plan view layout of an electrophoretic display device including a TFT array panel and a common electrode panel according to an exemplary embodiment of the present invention, FIG. 3 is a cross-sectional view of the electrophoretic display device shown in FIG. 2 taken along the line III-III, and FIG. 4 is a cross-sectional view of the electrophoretic display device shown in FIG. 2 taken along the line IV-IV.

Referring to FIGS. 1 to 4, an electrophoretic display device according to an exemplary embodiment includes a TFT array panel 100 having a plurality of TFTs, a common electrode panel 200 having a common electrode, an electrophoretic layer 300 interposed between the panels 100 and 200, and a sealant 310 sealing the electrophoretic layer 300.

Internal to the sealant 310 is a display area ("DA"), and external to the sealant 310 is a peripheral area ("PA"). The display area DA may include a plurality of gate lines 121 and a plurality of data lines 171 arranged, e.g., in a matrix pattern, and the peripheral area PA may include driver integrated circuits ("ICs"), etc.

The TFT array panel 100 will now be described.

A plurality of gate lines 121 and a plurality of storage electrode lines 131 are formed on an insulating substrate 110 made of a material such as transparent glass or plastic.

The gate lines 121 transmit gate signals and extend substantially in a transverse direction. Each of the gate lines 121 includes a plurality of gate electrodes 124 projecting downward and an end portion 129 having a large area for contact with another layer or an external driving circuit. A gate driving circuit (not shown) for generating the gate signals may be mounted on a flexible printed circuit ("FPC") film (not shown), which may be attached to the substrate 110, directly mounted on the substrate 110, or integrated with the substrate 110. The gate lines 121 may extend to be connected to a driving circuit that may be integrated with the substrate 110.

The storage electrode lines 131 are supplied with a predetermined voltage, and each of the storage electrode lines 131 includes a stem extending substantially parallel to the gate lines 121 and a plurality of pairs of storage electrodes 133a and 133b branched from the stem. Each of the storage electrode lines 131 is disposed between two adjacent gate lines 121, and the stem is closer to one of the two adjacent gate lines 121. Each of the storage electrodes 133a and 133b has a fixed end portion connected to the stem and a free end portion disposed opposite thereto. The fixed end portion of the storage electrode 133a has a large area, and the free end portion thereof is bifurcated into a linear branch and a curved branch. However, the storage electrode lines 131 may have various shapes and arrangements.

In one exemplary embodiment, the gate lines 121 and the storage electrode lines 131 may be made of an Al-containing metal such as Al and a Al alloy, a Ag-containing metal such as Ag and a Ag alloy, a Cu-containing metal such as Cu and a Cu alloy, a Mo-containing metal such as Mo and a Mo alloy, Cr, Ta, or Ti. Alternatively, they may have a multi-layered structure including two conductive films (not shown) having different physical characteristics. One of the two films may be made of a low resistivity metal including an Al-containing metal, an Ag-containing metal, or a Cu-containing metal for reducing signal delay or voltage drop. The other film may be made of a material such as a Mo-containing metal, Cr, Ta, or Ti, which has good physical, chemical, and electrical contact characteristics with other materials such as indium tin oxide (ITO) and indium zinc oxide (IZO). Exemplary examples of the combination of the two films include a lower Cr film and an upper Al (alloy) film and a lower Al (alloy) film and an upper Mo (alloy) film. However, the gate lines 121 and the storage electrode lines 131 may be made of various metals or conductors.

The lateral sides of the gate lines 121 and the storage electrode lines 131 are inclined relative to a surface of the substrate 110, and the inclination angle thereof is in a range of about 30 degrees to about 80 degrees.

In one exemplary embodiment, a gate insulating layer 140 made of silicon nitride (SiNx) or silicon oxide (SiOx) is formed on the gate lines 121 and the storage electrode lines 131.

A plurality of semiconductor stripes 151 made of, e.g., hydrogenated amorphous silicon (abbreviated to "a-Si") or polysilicon are formed on the gate insulating layer 140. Each of the semiconductor stripes 151 extends substantially in the longitudinal direction and includes a plurality of projections 154 branched out toward the gate electrodes 124.

A plurality of ohmic contact stripes and islands 161 and 165 are formed on the semiconductor stripes 151.

In one exemplary embodiment, the ohmic contact stripes and islands 161 and 165 are made of n+ hydrogenated a-Si heavily doped with an n-type impurity such as phosphorous, or they may be made of silicide. Each of the ohmic contact stripes 161 includes a plurality of projections 163, and the projections 163 and the ohmic contact islands 165 are located in pairs on the projections 154 of the semiconductor stripes 151.

The lateral sides of the semiconductors 151 and 154 and the ohmic contacts 161 and 165 are inclined relative to the surface of the substrate 110, and the inclination angles thereof are preferably in a range of about 30 degrees to about 80 degrees.

A plurality of data lines 171 and a plurality of drain electrodes 175 are formed on the ohmic contacts 161 and 165 and the gate insulating layer 140.

The data lines 171 transmit data signals and extend substantially in the longitudinal direction to intersect the gate lines 121. Each of the data lines 171 also intersects the storage electrode lines 131 and runs between adjacent pairs of storage electrodes 133a and 133b. Each data line 171 includes a plurality of source electrodes 173 projecting toward the gate electrodes 124 and an end portion 179 having a large area for contact with another layer or an external driving circuit. A data driving circuit (not shown) for generating the data signals may be mounted on an FPC film (not shown), which may be attached to the substrate 110, directly mounted on the substrate 110, or integrated with the substrate 110. The data lines 171 may extend to be connected to a driving circuit that may be integrated with the substrate 110.

The drain electrodes 175 are separated from the data lines 171 and disposed opposite the source electrodes 173 with respect to the gate electrodes 124.

Each of the drain electrodes 175 includes a wide end portion and a narrow end portion. The wide end portion overlaps a storage electrode line 131, and the narrow end portion is partly enclosed by a source electrode 173.

In one exemplary embodiment, a gate electrode 124, a source electrode 173, and a drain electrode 175, along with a projection 154 of a semiconductor stripe 151, collectively form a TFT having a channel formed in the projection 154 disposed between the source electrode 173 and the drain electrode 175.

The data lines 171 and the drain electrodes 175 may be made of a refractory metal such as Cr, Mo, Ta, Ti, and alloys thereof. However, it will be understood that they may have a multi-layered structure including a conductive film (not shown) such as a refractory metal film and a low resistivity film (not shown). Exemplary examples of the multilayered structure include a double-layered structure including a lower Cr/Mo (alloy) film and an upper Al (alloy) film, and a triple-layered structure of a lower Mo (alloy) film, an intermediate Al (alloy) film, and an upper Mo (alloy) film. However, it will be understood that the data lines 171 and the drain electrodes 175 may be made of various metals or conductors.

The data lines 171 and the drain electrodes 175 have inclined edge profiles, and the inclination angles thereof are in a range of about 30 degrees to about 80 degrees.

The ohmic contacts 161 and 165 are interposed only between the underlying semiconductors 151 and 154 and the overlying conductors 171 and 175 thereon, and reduce contact resistance therebetween.

However, the semiconductor stripes 151 may further include some exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 may be made of an inorganic or organic insulator and it may have a flat top surface. The organic insulator may have photosensitivity and a dielectric constant less than about 4.0 However, the passivation layer 180 may include a lower passivation film made of, e.g., an inorganic insulator such as silicon nitride or silicon oxide and an upper passivation film made of, e.g., an organic insulator.

The passivation layer 180 has a plurality of contact holes 182 and 185 exposing the end portions 179 of the data lines 171, and the drain electrodes 175, respectively. The passivation layer 180 and the gate insulating layer 140 have a plurality of contact holes 181 exposing the end portions 129 of the gate lines 121, a plurality of contact holes 183a exposing portions of the storage electrode lines 131 near the fixed end portions of the storage electrodes 133b, and a plurality of contact holes 183b exposing the linear branches of the free end portions of the first storage electrodes 133a.

A plurality of pixel electrodes 191, a plurality of overpasses 83, and a plurality of contact assistants 81 and 82 are formed on the passivation layer 180. They may be made of a transparent conductor such as ITO and IZO, or a reflective conductor such as Ag, Al, Cr, and alloys thereof.

The pixel electrodes 191 are physically and electrically connected to the drain electrodes 175 through the contact holes 185 such that the pixel electrodes 191 receive data voltages from the drain electrodes 175.

The pixel electrodes 191 supplied with the data voltages generate electric fields in cooperation with a common electrode 270 of the common electrode panel 200 supplied with a common voltage.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The overpasses 83 cross over the gate lines 121 and are connected to the exposed portions of the storage electrode lines 131 and the exposed linear branches of the free end portions of the storage electrodes 133a through the contact holes 183a and 183b, respectively, which are disposed opposite each other with respect to the gate lines 121. The storage electrode lines 131 including the storage electrodes 133a and 133b along with the overpasses 83 can be used for repairing defects in the gate lines 121, the data lines 171, or the TFTs.

The common electrode panel 200 will now be described in an exemplary embodiment.

As shown in FIG. 3, a light blocking member 220 referred to as a black matrix for preventing light leakage is formed on an insulating substrate 210 made of a material such as transparent glass or plastic.

A plurality of color filters 230 is also formed between the adjacent light blocking members 220. The color filters 230 may represent one of primary colors such as red, green, and blue colors.

The color filters 230 may extend substantially in the longitudinal direction along the pixel electrodes 191. Alternatively, the color filters 230 may be formed substantially in the areas enclosed by the gate lines 121 and the data lines 171, and may have a rectangular shape.

An overcoat 250 is formed on the color filters 230 and the light blocking member 220. The overcoat has a flat surface.

A common electrode 270 is formed on the overcoat 250. The common electrode 270 is made of, e.g., a transparent conductive material such as ITO and IZO.

The electrophoretic display device having the above-described construction is a top emission type that emits light toward the color filters 230 to display images in the upper direction with respect to the substrate 110. Electrophoretic members 330 function as an optical shutter to represent a black and white mode and a gray mode by absorbing or reflecting external light to enter.

The electrophoretic layer 300 interposed between the TFT array panel 100 and the common electrode panel 200 includes a binder 340 and a plurality of electrophoretic members 330.

The binder 340 may be made of a curable resin, etc. The electrophoretic members 330 include a dispersion medium 328, electrophoretic particles 323 and 326, and capsules 320.

The electrophoretic particles 323 and 326 are dispersed and fixed in the dispersion medium 328, and electrophoretic particles 323 have a negative charge and electrophoretic particles 326 have a positive charge.

The capsules 320 encapsulate the electrophoretic particles 323 and 326, respectively.

The electrophoretic particles 323 having the negative charge may represent a black color, and the electrophoretic particles 326 having the positive charge may represent a white color, but this may be varied.

The capsules 320 are fixed between the TFT array panel 100 and the common electrode panel 200 with the binder 340.

Positions of the electrophoretic particles 323 and 326 are changed by electrical fields generated between the pixel electrodes 191 and the common electrode 270 to display desired images in the display area DA.

The electrophoretic particles 323 and 326 represent a white or black image in the white and black mode. That is, when the electrophoretic particles 326 representing the white color move toward the common electrode 270, the white image is displayed, and when the electrophoretic particles 323 representing the black color move toward the common electrode 270, the black image is displayed. Further, the electrophoretic particles 323 and 326 represent a gray image in the gray mode. That is, when the electrophoretic particles 326 representing the white color move and the electrophoretic particles 323 representing the black color move toward the common electrode 270, the gray image is displayed by combining the white color and the black color.

Thereby, the electrophoretic display device having the electrophoretic layer 300 interposed with a uniform thickness emits light of a uniform transmittance in the entire display area DA.

A manufacturing method of the TFT array panel 100 will now be described with reference to FIGS. 5 to 16 as well as FIGS. 1 to 4.

Figure 5:
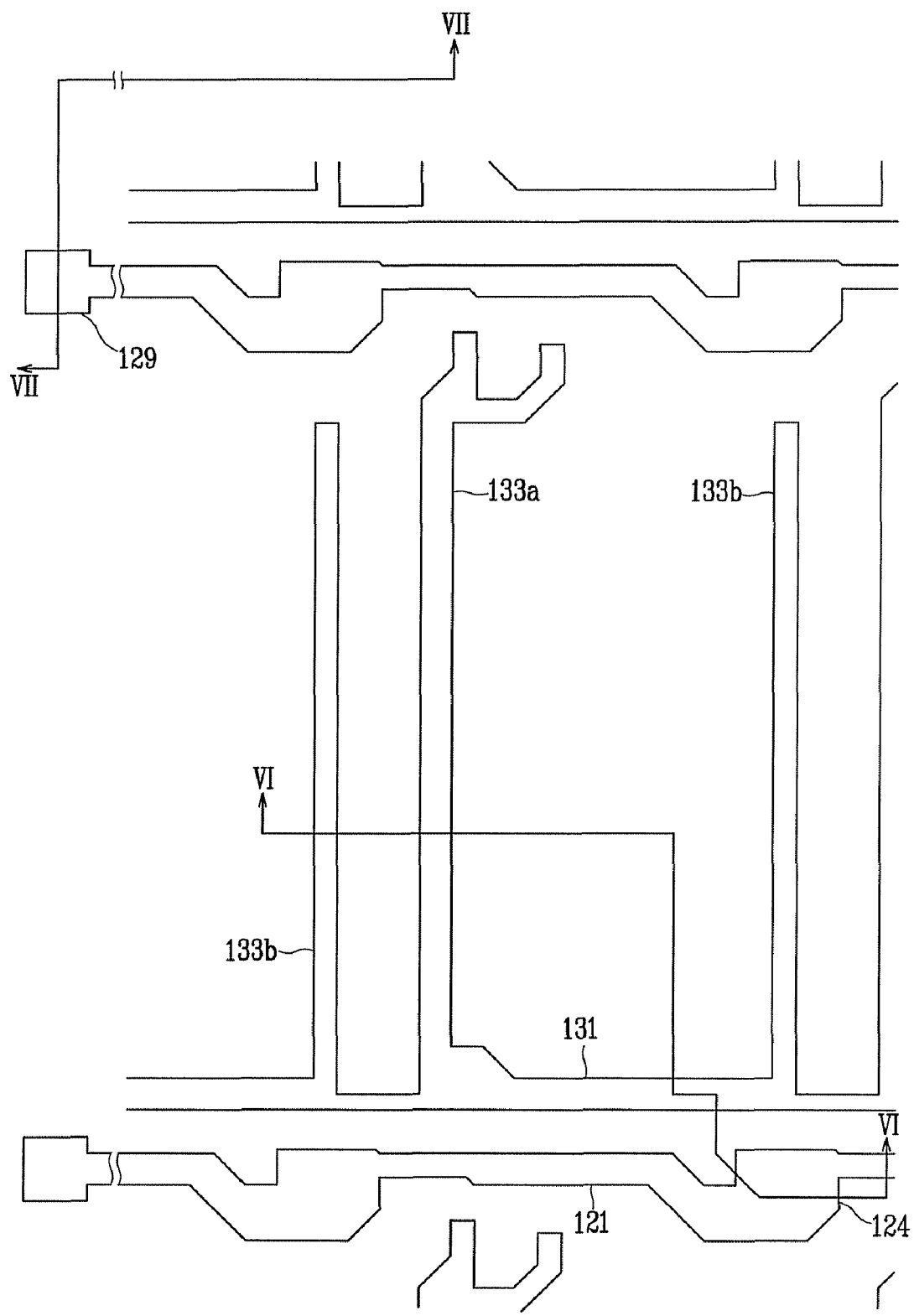
FIG. 5 is a plan view layout of the TFT array panel shown in FIG. 2 in intermediate steps of a manufacturing method thereof according to an exemplary embodiment of the present invention.
Figure 6:
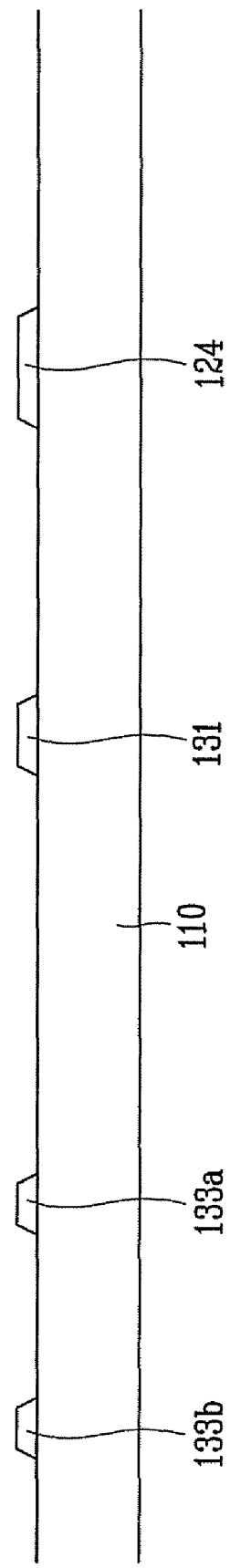
FIG. 6 is a cross-sectional view of the TFT array panel shown in FIG. 5 taken along the line VI-VI.
Figure 7:
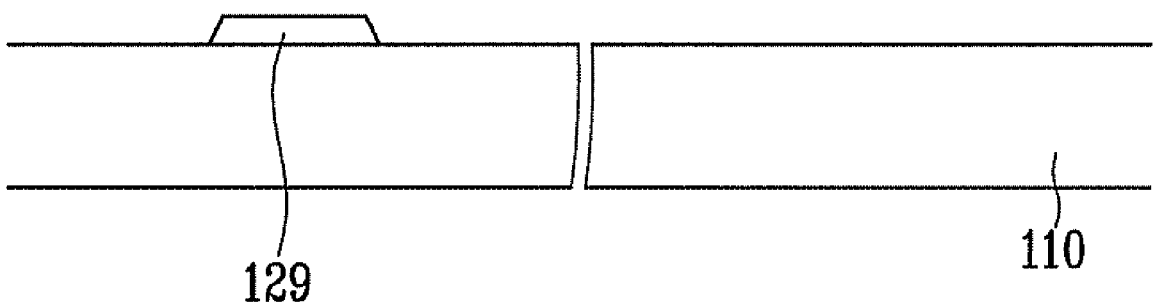
FIG. 7 is a cross-sectional view of the TFT array panel shown in FIG. 5 taken along the line VII-VII.
Figure 8:
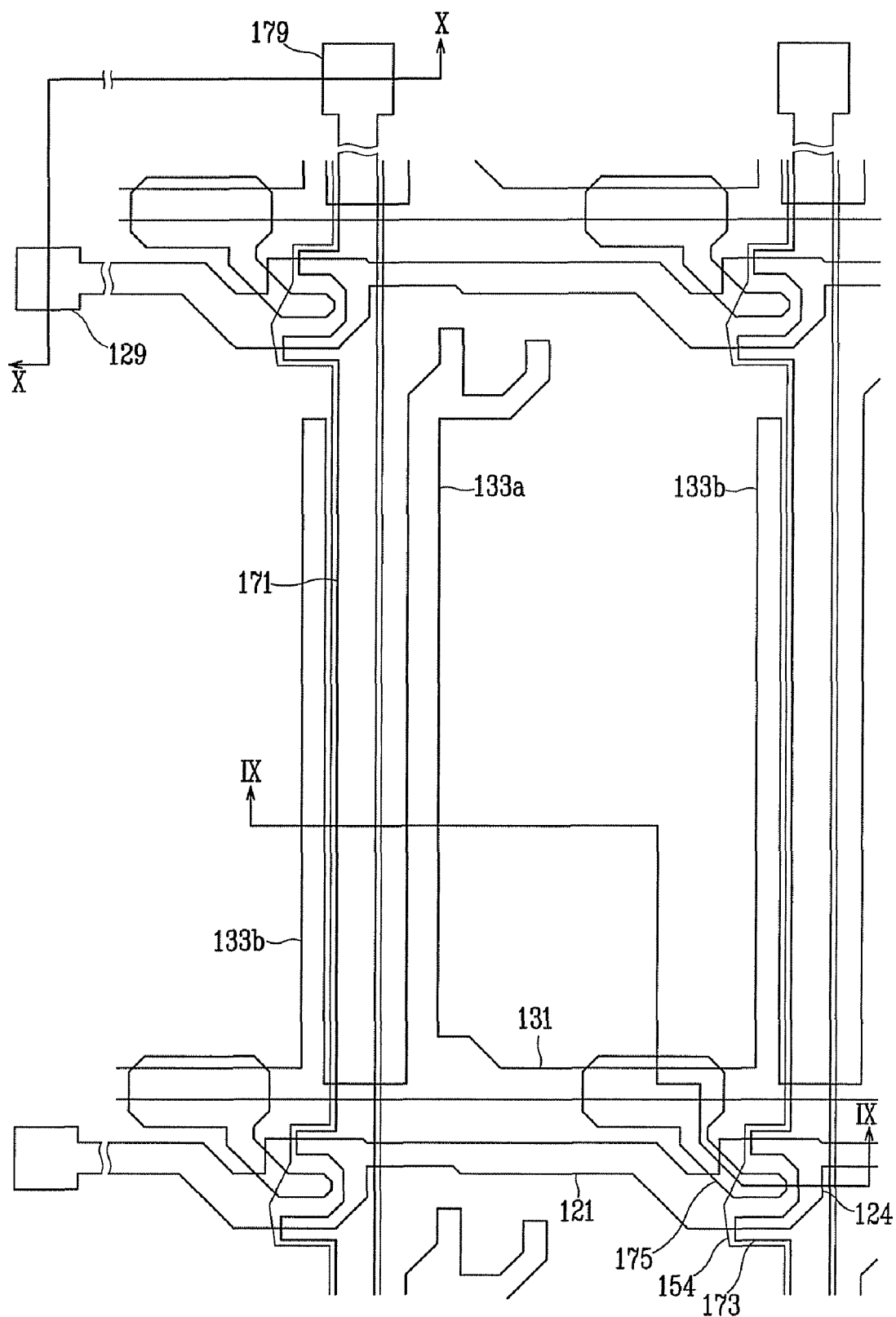
FIG. 8 is a plan view layout of the TFT array panel in a manufacturing step following the manufacturing step shown in FIG. 5.
Figure 9:
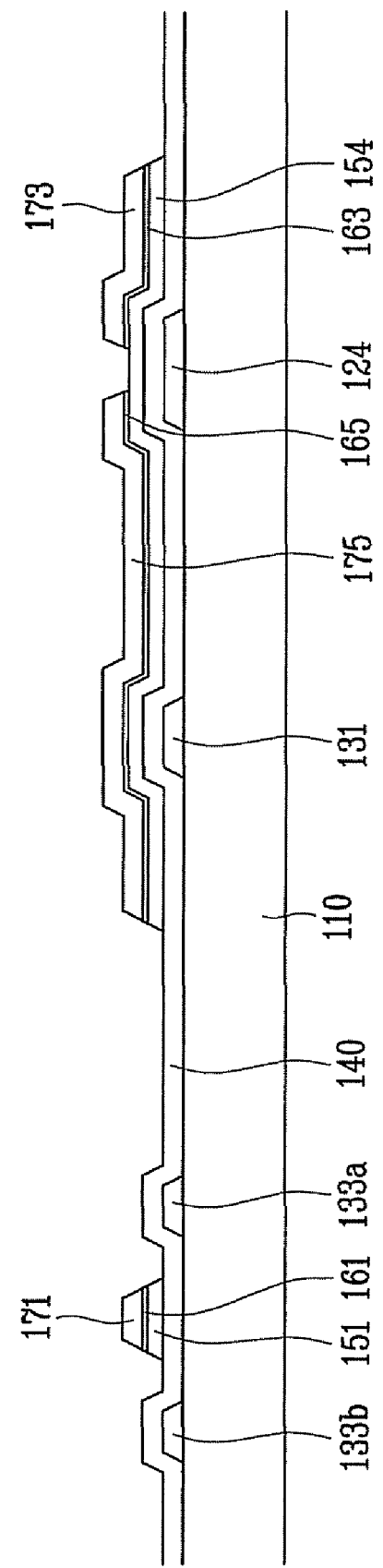
FIG. 9 is a cross-sectional view of the TFT array panel shown in FIG. 8 taken along the line IX-IX.
Figure 10:
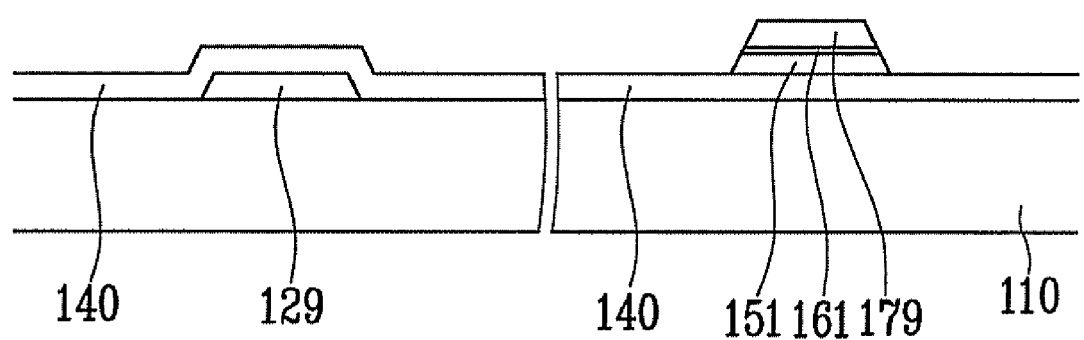
FIG. 10 is a cross-sectional view of the TFT array panel shown in FIG. 8 taken along the line X-X.
Figure 11:
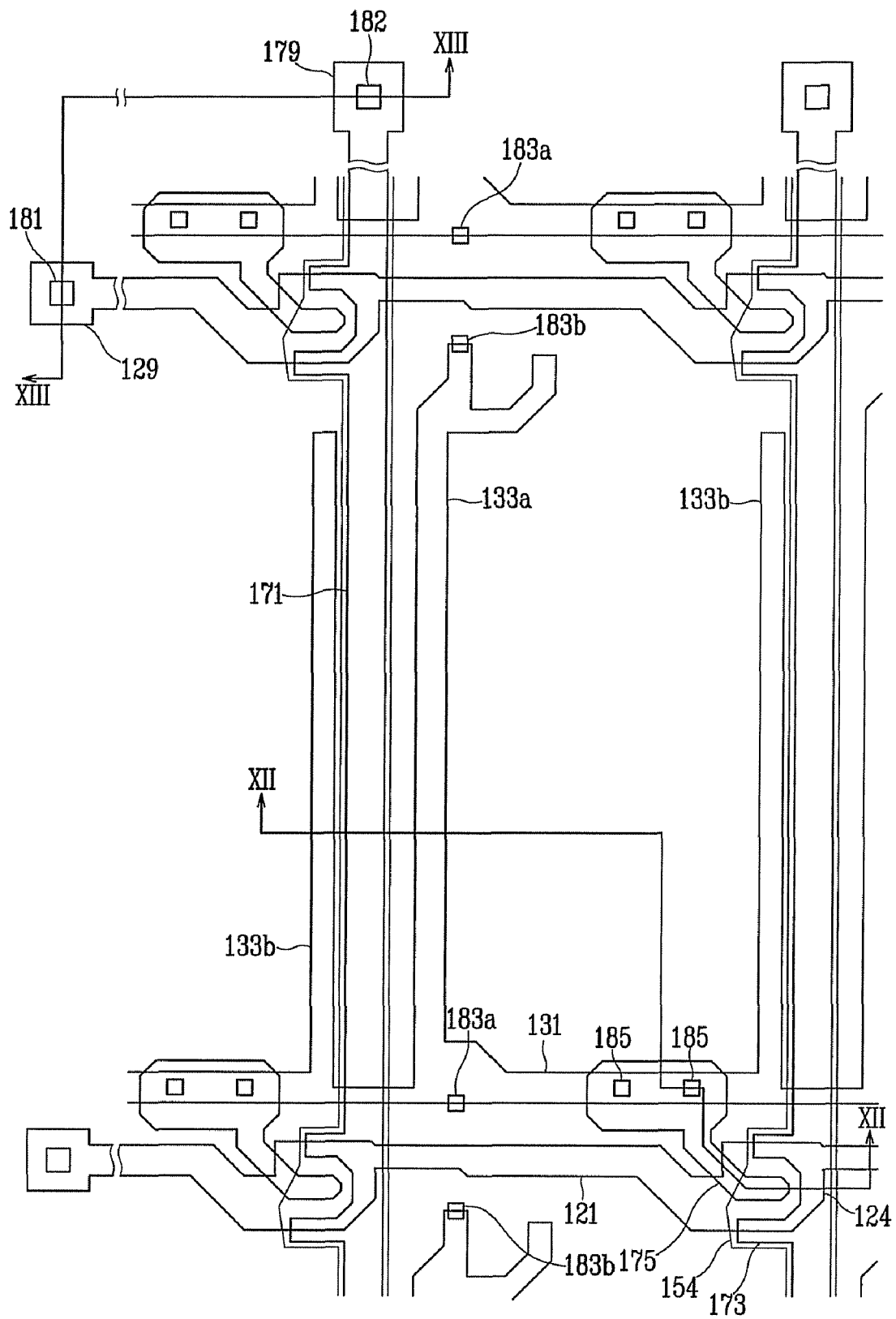
FIG. 11 is a plan view layout of the TFT array panel in a manufacturing step following the manufacturing step shown in FIG. 8.
Figure 12:
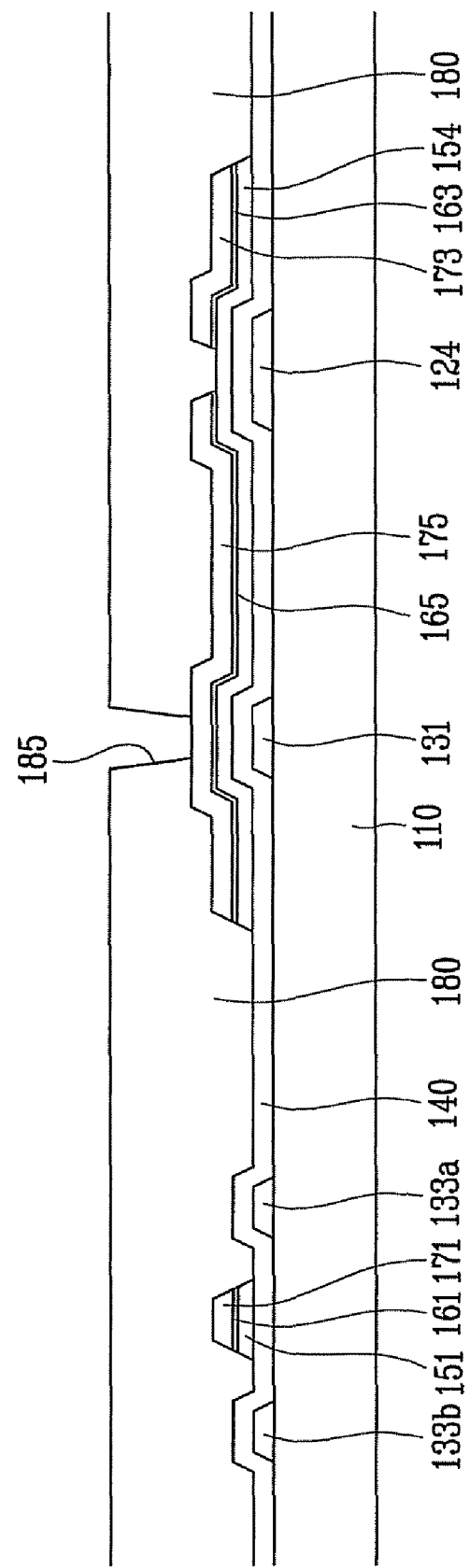
FIG. 12 is a cross-sectional view of the TFT array panel shown in FIG. 11 taken along the line XII-XII.
Figure 13:
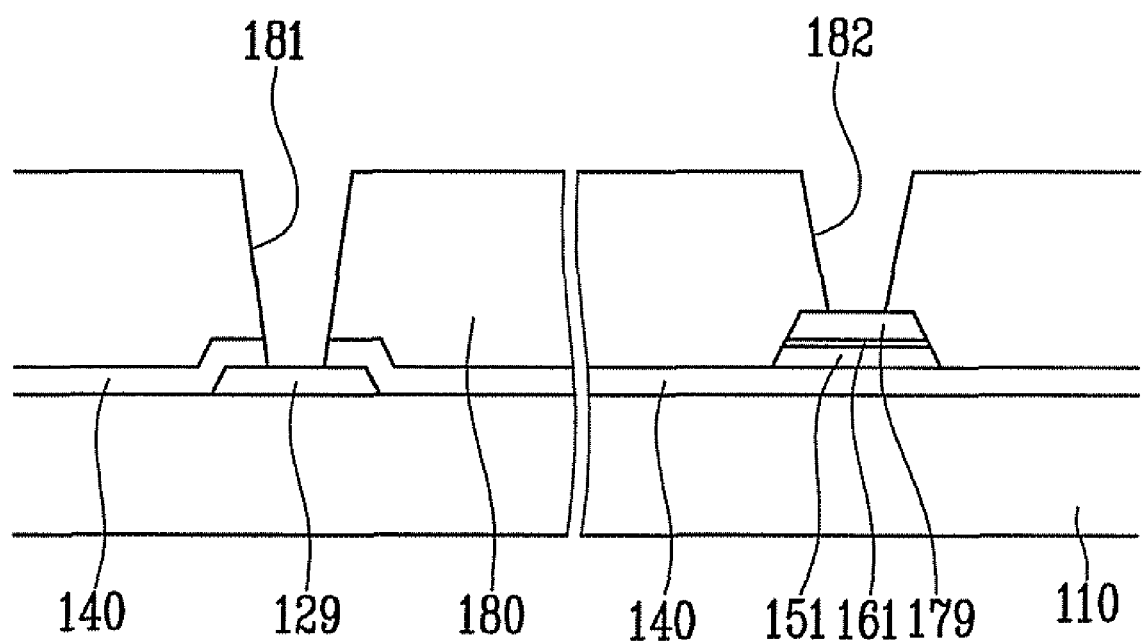
FIG. 13 is a cross-sectional view of the TFT array panel shown in FIG. 11 taken along the line XIII-XIII.
Figure 14:
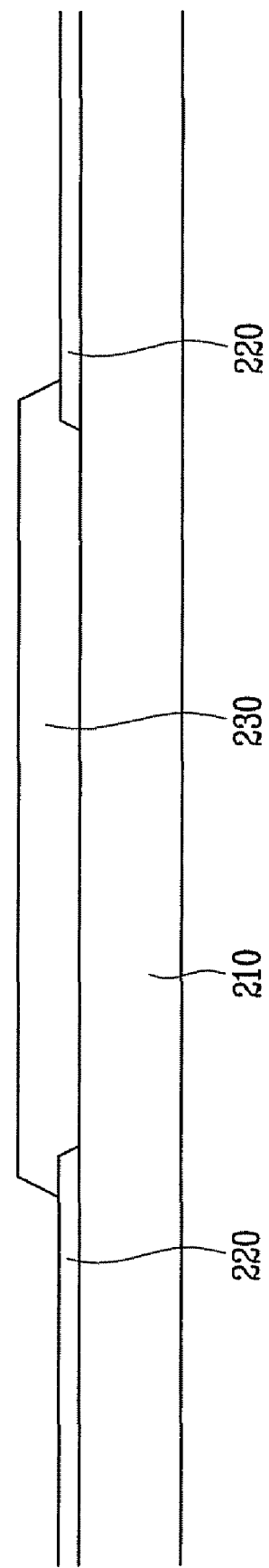
FIG. 14 is a plan view layout of the common electrode panel shown in FIG. 2 in intermediate steps of a manufacturing method thereof according to an exemplary embodiment of the present invention.
Figure 15:
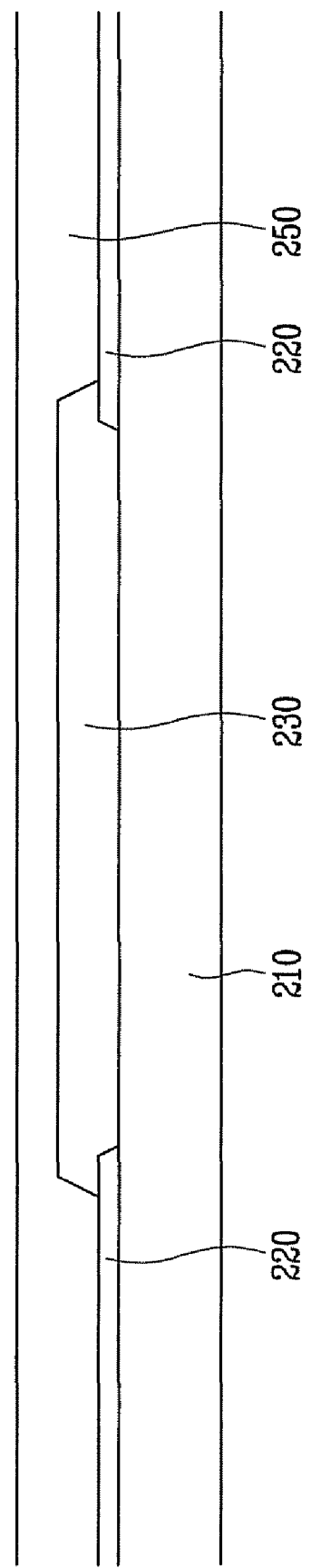
FIG. 15 illustrates a manufacturing step following the manufacturing step shown in FIG. 14.
Figure 16:
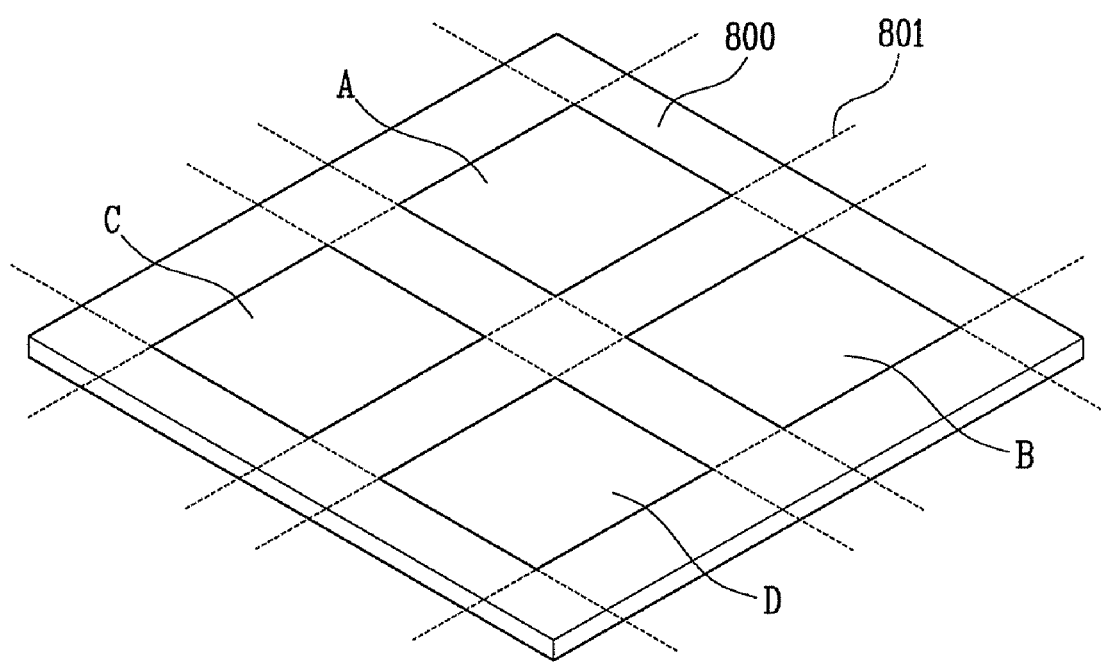
FIG. 16 is a perspective view of a lower mother substrate for manufacturing the TFT array panel shown in FIG. 2.

FIG. 5 is a plan view layout of the TFT array panel shown in FIG. 2 in intermediate steps of a manufacturing method thereof according to an exemplary embodiment of the present invention, FIG. 6 is a cross-sectional view of the TFT array panel shown in FIG. 5 taken along the line VI-VI, FIG. 7 is a cross-sectional view of the TFT array panel shown in FIG. 5 taken along the line VII-VII, FIG. 8 is a plan view layout of the TFT array panel in a manufacturing step following the manufacturing step shown in FIG. 5, FIG. 9 is a cross-sectional view of the TFT array panel shown in FIG. 8 taken along the line IX-IX, FIG. 10 is a cross-sectional view of the TFT array panel shown in FIG. 8 taken along the line X-X, FIG. 11 is a plan view layout of the TFT array panel in a manufacturing step following the manufacturing step shown in FIG. 8, FIG. 12 is a cross-sectional view of the TFT array panel shown in FIG. 11 taken along the line XII-XII, FIG. 13 is a cross-sectional view of the TFT array panel shown in FIG. 11 taken along the line XIII-XIII, FIG. 14 is a plan view layout of the common electrode panel shown in FIG. 2 in intermediate steps of a manufacturing method thereof according to an exemplary embodiment of the present invention, FIG. 15 illustrates a manufacturing step following the manufacturing steps shown in FIG. 14, and FIG. 16 is a perspective view of a lower mother substrate for manufacturing the TFT array panels shown in FIG. 2.

As shown in FIGS. 5 to 7 and 16, a metal layer is deposited on a lower mother substrate 800 having a plurality of sub-regions A, B, C, and D by sputtering, etc. The metal layer is then subjected to lithography and etching to form a plurality of gate lines 121 including gate electrodes 124 and end portions 129 and a plurality of storage electrode lines including storage electrodes 133a and 133b in the sub-regions A, B, C, and D.

Referring to FIGS. 8 to 10, a gate insulating layer 140 is deposited on the lower mother substrate 800, to form the gate insulating layer 140 on the gate lines 121, the storage electrode lines 131, and the substrate 110. The gate insulating layer 140 may be made of silicon nitride (SiNx) or silicon oxide (SiOx).

An intrinsic a-Si layer in which no impurity is doped and an extrinsic a-Si layer (n+ a-Si) in which an impurity is doped are sequentially deposited on the lower mother substrate 100 by plasma enhanced chemical vapor deposition (PECVD), and then a data layer is formed on the extrinsic a-Si layer. The metal layer may be made of a metal such as molybdenum (Mo).

The metal layer, the extrinsic a-Si layer, and the intrinsic a-Si layer are sequentially etched using a mask to form data lines including source electrodes 173, drain electrodes 175, ohmic contacts 161 and 165, and semiconductors 151.

Referring to FIGS. 11 to 13, a passivation layer 180 is then formed on the lower mother substrate 800, the gate insulating layer 140, the data lines 171, and the drain electrodes 175. The passivation layer 180 may be made of an organic insulator. The organic insulator may have photosensitivity and a dielectric constant lower than about 4.0.

Referring to FIGS. 3 and 4, the passivation layer 180 and the gate insulating layer 140 are etched to form a plurality of contact holes 181, 182, 183a, 183b, and 185 exposing the end portions 129 of the gate lines 121, the end portions 179 of the data lines 171, portions of the storage electrode lines 131 near fixed end portions, portions of the linear portions of the free end portions of the storage electrodes 133a, and portions of the drain electrodes 175, respectively.

A transparent electrode made of, e.g., IZO or ITO is deposited on the entire lower mother substrate 800 by sputtering, etc. The transparent electrode is subjected to lithography and etching to form a plurality of pixel electrodes 191, a plurality of overpasses 83, and contact assistants 81 and 82 on the contact holes 181, 182, 183a, 183b, and 185, and on the passivation layer 180.

A manufacturing method of the common electrode panel 200 will now be described in detail in an exemplary embodiment.

An opaque metal is deposited on a substrate 210 of an upper mother substrate 900 having a plurality of sub-regions (not shown). The opaque metal may be made of chromium, etc. The opaque metal is subjected to lithography and etching to form a light blocking member 220 on the sub-regions.

A photoresist including a red pigment is coated on the light blocking member 220 and the substrate 210, exposed to light, and developed to form red color filters 230 on the sub-regions. A photoresist including a green pigment is coated on the light blocking member 220 and the substrate 210, exposed to light, and developed to form the green color filters 230 on the sub-regions, and then a photoresist including a blue pigment is coated on the light blocking member 220 and the substrate 210, exposed to light, and developed to form the blue color filters 230 on the sub-regions. It will be understood that the above-described sequence with respect to formation of the red, green, and blue color filters 230 may be changed. Sequentially, an organic insulating material is formed on the entire surface of the upper mother substrate 200 to form the overcoat 250, and then a transparent conductive material is deposited on the overcoat 250 to form the common electrode 270.

After the formation of the lower mother substrate 800 including the TFT array panels 100 and the upper mother substrate 900 including the common electrode panels 200, the panels 100 and 200 are combined, and the electrophoretic layer 300 is formed between the panels 100 and 200.

An exemplary embodiment of a formation operation of the electrophoretic layer 300 and the combination operation of the panels 100 and 200 will be described with reference to FIGS. 17 to 19.

Figure 17:
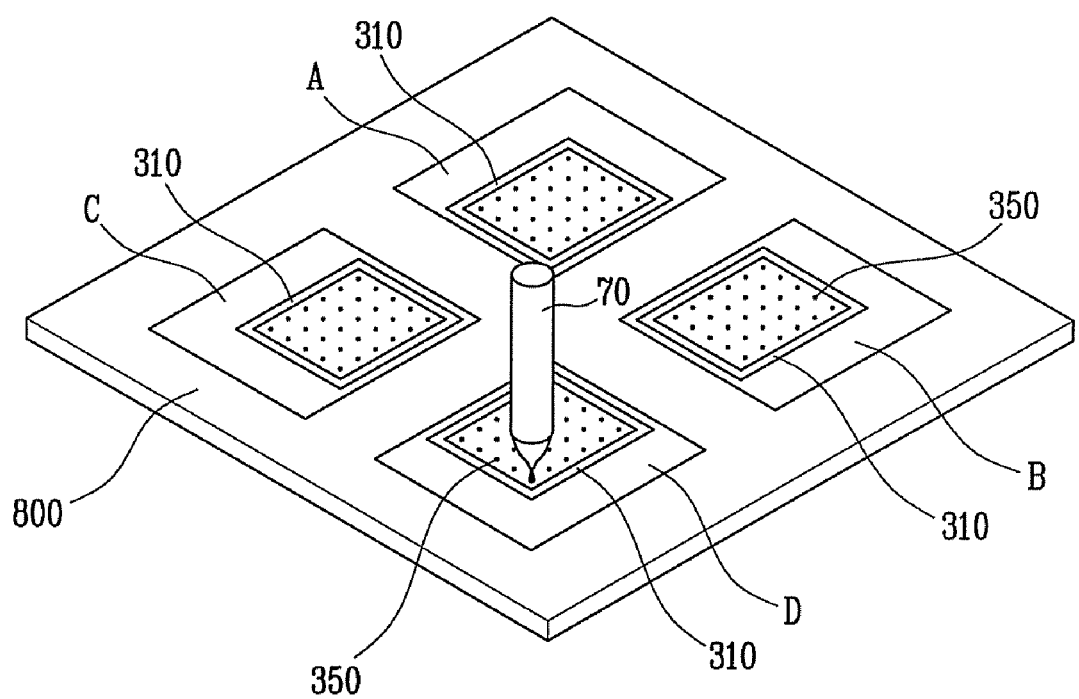
FIG. 17 shows a lower mother substrate having electrophoretic material disposed thereon for forming an electrophoretic layer of an electrophoretic display device according to an exemplary embodiment of the present invention.
Figure 18:
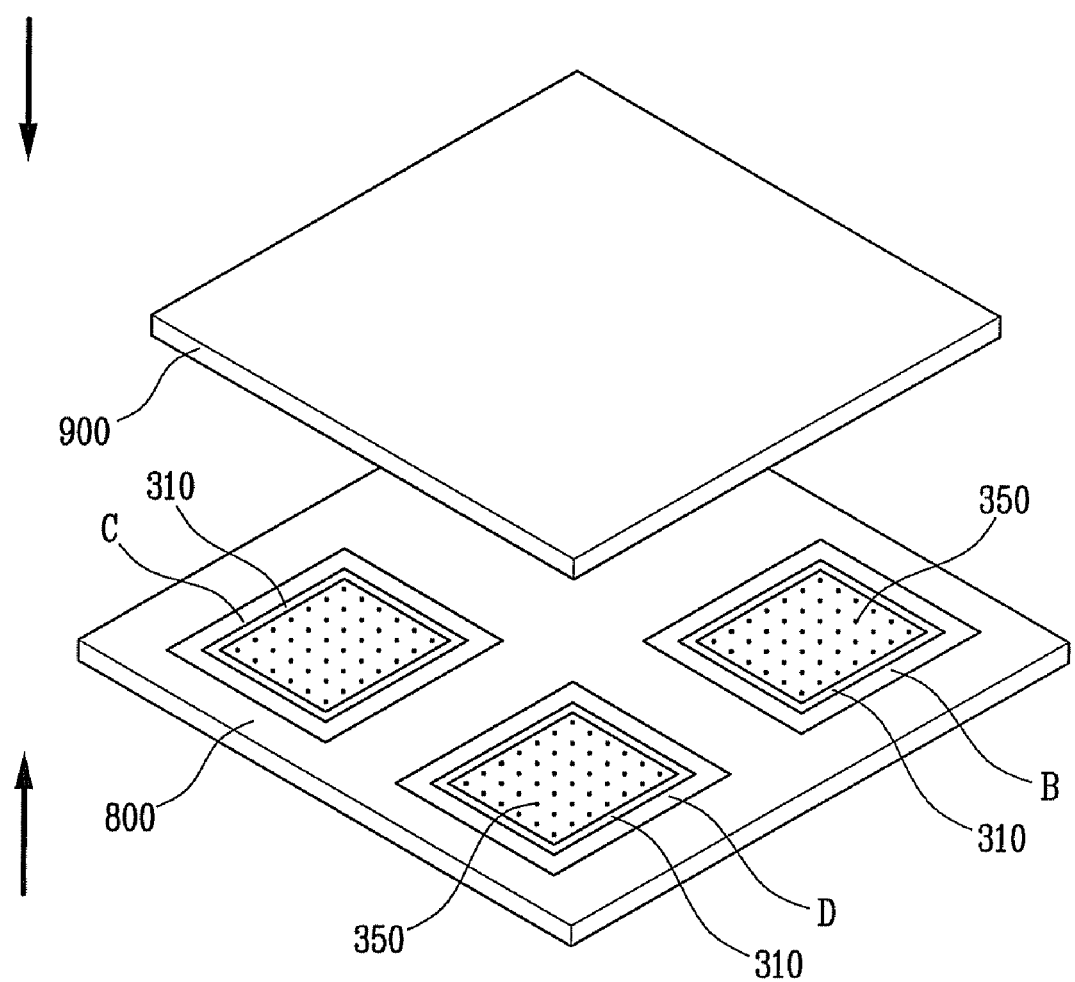
FIG. 18 is a perspective view of the lower mother substrate and the upper mother substrate prior to combination thereof according to an exemplary embodiment of the present invention.
Figure 19:
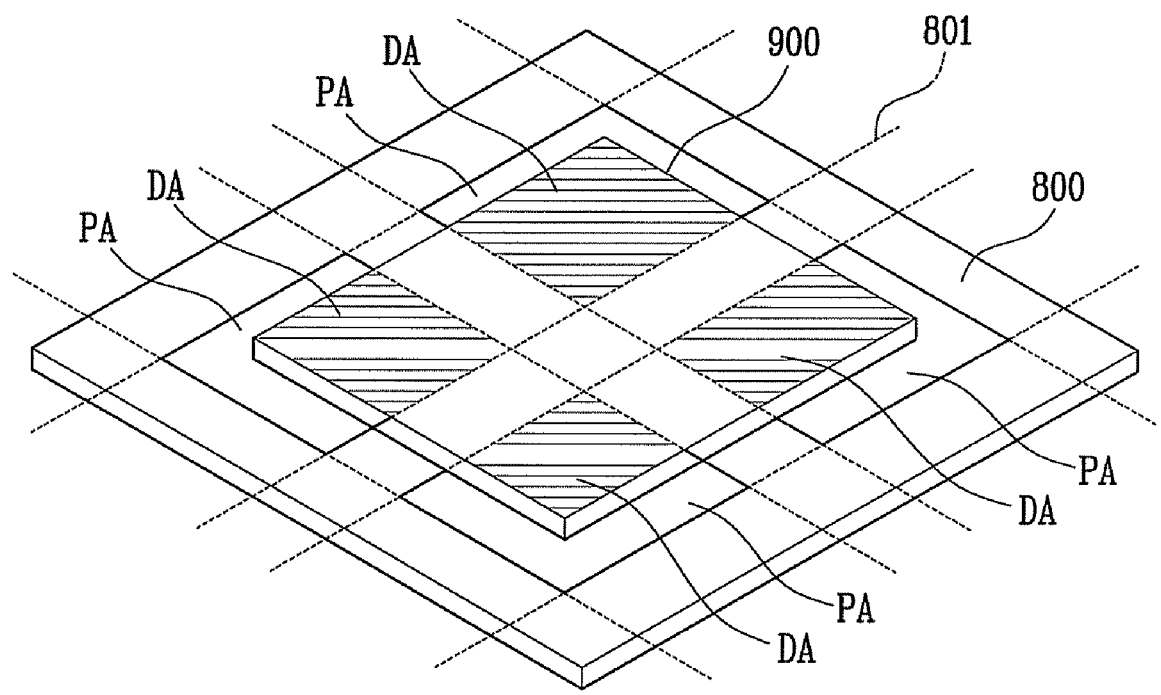
FIG. 19 is a perspective view of the lower mother substrate and the upper mother substrate subsequent to combination thereof according to an exemplary embodiment of the present invention.

FIG. 17 shows a lower mother substrate having electrophoretic material disposed thereon for forming an electrophoretic layer of an electrophoretic display device according to an exemplary embodiment of the present invention, FIG. 18 is a perspective view of the lower mother substrate and the upper mother substrate prior to combination thereof according to an exemplary embodiment of the present invention, and FIG. 19 is a perspective view of the lower mother substrate and the upper mother substrate subsequent to combination thereof according to an exemplary embodiment of the present invention.

As shown in FIG. 17, an electrophoretic material 350 in which the electrophoretic members 330 and the binder 340 are mixed and is disposed in a matrix pattern on the sub-regions A, B, C, and D of the lower mother substrate 800 through a nozzle 70. In particular, the electrophoretic material 350 is disposed on sub-regions formed on the lower mother substrate facing the upper mother substrate. When viscosity of the electrophoretic material is less than about 100 cp, the electrophoretic material 340 of several tens of microliters or less every $cm^2$ may be disposed in several locations.

Portions on which the electrophoretic material 350 is disposed are enclosed by a sealant 310. Thereby, portions of the sub-portions A, B, C, and D forming the TFTs, the gate lines 121, the storage electrode lines 131, the semiconductors 151, the data lines 171, the drain electrodes 175, etc., are disposed internal to the sealant 310. The regions enclosed by the sealant 310 are display areas DA, on which images are displayed.

As shown in FIGS. 18 and 19, an upper mother substrate 900 is combined with the lower mother substrate 800 in a vacuum ambient.

The upper mother substrate 900 and the lower mother substrate 800 are combined with the sealant 310.

Since the upper mother substrate 900 and the lower mother substrate 800 are pressed in the vacuum ambient to combine the substrates 800 and 900, undesired bubbles are prevented from forming between the upper mother substrate 900 and the lower mother substrate 800.

When the upper mother substrate 900 is combined with the lower mother substrate 800 in the vacuum ambient, the moisture content of the electrophoretic material 350 is reduced to a relative humidity of about 40% to about 60%, which is suitable to optimize characteristics of the electrophoretic particles 323 and 326. Thus, in this embodiment, the moisture content of the electrophoretic material 350 is automatically controlled without requiring a separate moisture control process, as compared to conventional manufacturing methods, thereby simplifying the overall manufacturing process.

That is, an example of the conventional manufacturing methods applies an electrophoretic material on a lower mother substrate, followed by application of a plastic film to cover the applied electrophoretic material. The lower mother substrate is then dried in an oven, etc., to remove most of the moisture of the electrophoretic material, and then is placed in a constant moisture tank of a relative humidity of about 50% for about five days, such that the moisture content of the electrophoretic material is controlled to a relative humidity of about 40% to about 60%.

After removing the plastic film, the upper mother substrate and the lower mother substrate are combined by the electrophoretic material functioning as an adhesive. That is, for combining the upper and lower mother substrates, about five days or more is required, such that manufacturing efficiency of the electrophoretic display device of the prior art is decreased.

As described above, for the electrophoretic material 350 that is dropped in the vacuum ambient, and when the lower and upper mother substrates 800 and 900 are in the vacuum ambient, the moisture content of the electrophoretic material is controlled to an optimum condition. Thus, compared with the conventional manufacturing method, the time for controlling the moisture content of the electrophoretic material 350 is largely decreased, and thereby in this embodiment, for manufacturing the electrophoretic display device, about one day or less is required such that the productivity is increased.

The electrophoretic material 350 may be disposed on the lower mother substrate 800 in a dot shape such that it uniformly spreads in all directions by the applied pressure when the upper and lower mother substrates 800 and 900 are combined, to form an electrophoretic layer 300 having even distribution and thickness. Thereby, image quality of the electrophoretic display device is improved. The electrophoretic layer 300 is sealed into the display areas DA by the sealant 310.

The mother substrate 800 is then cut along a cut line 801 formed thereon, thereby resulting in sub-upper mother substrates and sub-lower mother substrates which are separated from the mother substrates 900 and 800 and function as the common electrode panel 200 and the TFT array panel 100, respectively.

Next, another exemplary embodiment for forming the electrophoretic layer 300 will be described with reference to FIG. 20.

Figure 20:
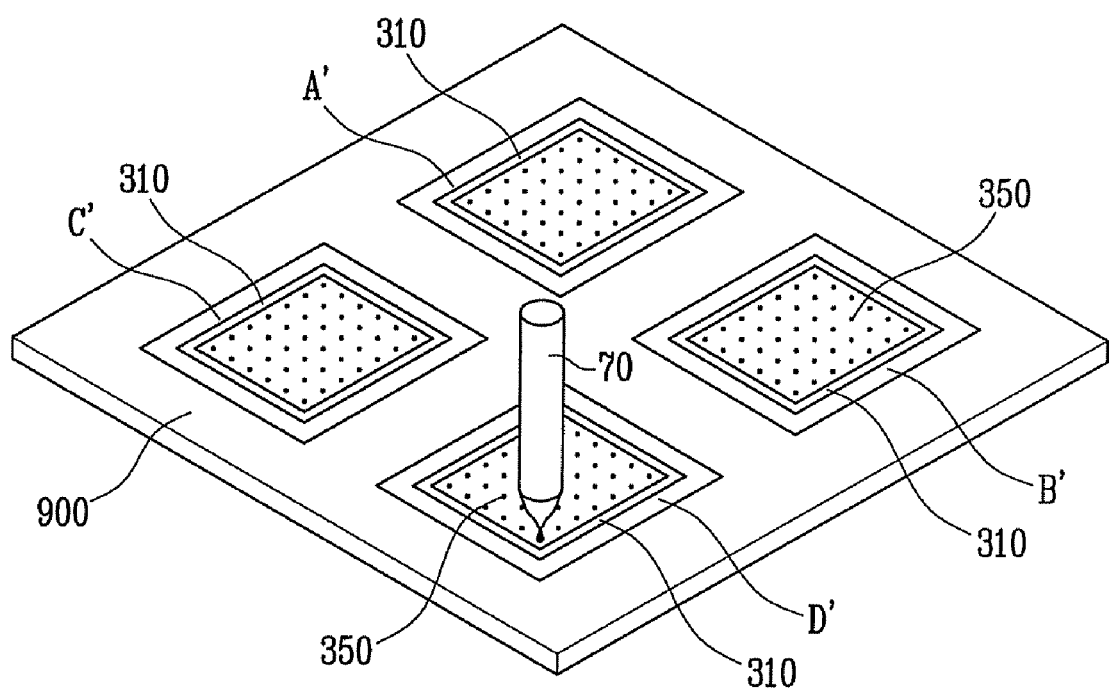
FIG. 20 shows an upper mother substrate having electrophoretic material disposed thereon for forming an electrophoretic layer of an electrophoretic display device according to an exemplary embodiment of the present invention.

FIG. 20 shows an upper mother substrate having electrophoretic material disposed thereon for forming an electrophoretic layer of an electrophoretic display device according to an exemplary embodiment of the present invention.

In this embodiment, except for the electrophoretic material 350 being dropped on sub-regions of the upper mother substrate 900 rather than the sub-regions of a lower mother substrate 800, the formation operation of the electrophoretic layer 300 is almost the same as the operation described above with respect to FIGS. 17 to 19. Referring to FIG. 20, after disposing the electrophoretic material 350 on the sub-regions A', B', C', and D' of the upper mother substrate 900 through a nozzle, the light blocking member 220, the color filters 230, the common electrode 270, etc., formed on the sub-regions A', B', C', and D' of the upper mother substrate 900 are enclosed by a sealant 310. The regions enclosed by the sealant 310 are display areas DA, on which images are displayed.

The upper mother substrate 900 and the lower mother substrate 800 are then pressure-combined with each other. Thereby, the upper mother substrate 900 and the lower mother substrate 800 are combined with the sealant 310.

As described above, since a separate moisture control process is not required, a manufacturing process is simplified and the electrophoretic layer 300 is formed with uniform distribution and thickness without undesired bubbles.

According to this exemplary embodiment, a manufacturing process of electrophoretic display devices is simplified and the manufacturing time of the electrophoretic display devices is shortened, and thereby productivity improves.

As described above, since an electrophoretic layer is formed with uniform distribution and thickness without undesired bubbles, image quality of the electrophoretic display devices is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of an electrophoretic display device, the manufacturing method comprising:
   forming a first mother substrate that has a first thin structure;
   forming a second mother substrate that has a second thin structure, wherein the second mother substrate faces the first mother substrate;
   disposing an electrophoretic material on one of the first mother substrate and the second mother substrate;
   enclosing a region on which the electrophoretic material is disposed with a sealant; and
   combining the first mother substrate and the second mother substrate using pressure applied thereto, while forming an electrophoretic layer between the first mother substrate and the second mother substrate,
   wherein the formation of the first mother substrate comprises:
     forming a gate electrode on a substrate;
     forming a semiconductor on the gate electrode;
     forming a source electrode and a drain electrode on the semiconductor; and
     forming a pixel electrode on the source electrode and the drain electrode, the pixel electrode being connected to the drain electrode.

2. The manufacturing method of claim 1, further comprising cutting the combined first mother substrate and second mother substrate.

3. The manufacturing method of claim 1, wherein the second thin film structure comprises a common electrode.

4. The manufacturing method of claim 3, wherein the formation of the second mother substrate comprises:
    forming a light blocking member on a substrate;
    forming color filters on the light blocking member; and
    forming the common electrode on the color filters.

5. The manufacturing method of claim 3, wherein the electrophoretic material is disposed in a matrix pattern.

6. The manufacturing method of 1, wherein the electrophoretic material comprises:
    a first electrophoretic particle representing a first color;
    a second electrophoretic particle representing a second color different from the first color;
    a dispersion medium in which the first electrophoretic particle and the second electrophoretic particle are dispersed;
    a capsule that encapsulates the first electrophoretic particle and the second electrophoretic particle; and
    a binder fixing the capsule.

7. The manufacturing method of claim 6, wherein the first color is white, and the second color is black.

8. The manufacturing method of claim 1, wherein the electrophoretic material has a moisture content of about 40% to about 60%.

9. The manufacturing method of claim 1, wherein the first mother substrate comprises a plurality of sub-regions, the method further comprising cutting the first mother substrate along lines formed between the sub-regions.

10. The manufacturing method of claim 9, wherein the thin film transistor is formed on the sub-regions.

11. The manufacturing method of claim 3, wherein the second mother substrate comprises a plurality of sub-regions, the method further comprising cutting the second mother substrate along lines formed between the sub-regions.

12. The manufacturing method of claim 11, wherein the common electrode is formed on the sub-regions.

* * * * *